(12) United States Patent
Ryu et al.

(10) Patent No.: US 10,374,911 B2
(45) Date of Patent: Aug. 6, 2019

(54) DEVICE MANAGEMENT IN MACHINE TO MACHINE NETWORK

(71) Applicant: KT CORPORATION, Gyeonggi-do (KR)

(72) Inventors: Hwi-Jung Ryu, Seoul (KR); Mi-Kyoung Kang, Seoul (KR); Yong Kwon, Gyeonggi-do (KR); Sung-Ihk Yang, Seoul (KR); Kwang-Jin Lee, Seoul (KR); Sung-Kooc Lim, Gyeonggi-do (KR); Yu-Jin Huh, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 464 days.

(21) Appl. No.: 14/190,602

(22) Filed: Feb. 26, 2014

(65) Prior Publication Data

US 2014/0244838 A1 Aug. 28, 2014

(30) Foreign Application Priority Data

Feb. 26, 2013 (KR) ........................ 10-2013-0020596

(51) Int. Cl.
*H04W 4/38* (2018.01)
*H04W 4/50* (2018.01)
*H04L 12/24* (2006.01)
*H04L 12/26* (2006.01)

(52) U.S. Cl.
CPC .............. *H04L 43/04* (2013.01); *H04W 4/38* (2018.02); *H04L 41/0893* (2013.01); *H04W 4/50* (2018.02)

(58) Field of Classification Search
CPC .... H04L 43/04; H04L 41/0893; H04W 4/006; H04W 4/001
See application file for complete search history.

(56) References Cited

U.S. PATENT DOCUMENTS

| | | | |
|---|---|---|---|
| 2006/0085536 A1* | 4/2006 | Meyer ................. | G06F 11/3495 709/224 |
| 2008/0107037 A1* | 5/2008 | Forbes ................. | H04L 63/126 370/242 |
| 2009/0043879 A1* | 2/2009 | Jamieson ............... | H04L 45/00 709/223 |
| 2012/0197898 A1* | 8/2012 | Pandey ................. | H04L 67/12 707/741 |
| 2013/0311640 A1* | 11/2013 | Gleixner ............. | H04W 40/246 709/224 |

FOREIGN PATENT DOCUMENTS

| | | |
|---|---|---|
| JP | 2013-037519 A | 2/2013 |
| KR | 10-2010-0064462 A | 6/2010 |
| KR | 10-2011-0060556 A | 6/2011 |
| KR | 10-2011-0060568 A | 6/2011 |
| KR | 10-1150896 B1 | 6/2012 |

* cited by examiner

*Primary Examiner* — Michael A Keller
*Assistant Examiner* — Austin J Moreau
(74) *Attorney, Agent, or Firm* — IP Legal Services, LLC

(57) ABSTRACT

The present disclosure is related to device management in a machine to machine (M2M) network. Particularly, the present disclosure relates to performing an efficient device management based on correlations between M2M devices in the M2M network.

16 Claims, 7 Drawing Sheets

DEVICE MANAGEMENT IN MACHINE TO MACHINE NETWORK

CROSS REFERENCE TO PRIOR APPLICATIONS

The present application claims priority under 35 U.S.C. § 119 to Korean Patent Application No. 10-2013-0020596 (filed on Feb. 26, 2013), which is hereby incorporated by reference in its entirety.

TECHNICAL FIELD

The present disclosure relates to management of a machine to machine (M2M) network, in particular, to performing an efficient network management based on correlations between M2M devices in an M2M network.

BACKGROUND

A machine to machine (M2M) communication refers to any communication scheme which does not require human intervention in the process of communication. In other words, the M2M communication refers to a communication for providing persons or intelligent equipment with object information using communication networks, or allowing persons or intelligent equipment to control states of objects. The M2M communication may be variously referred to as a machine type communication (MTC), Internet of things (IoT), a smart device communication (SDC), a machine oriented communication (MOC), or an object to object intelligent network (O2N).

The M2M communication is based on the European Telecommunication Standards Institute (ETSI) standard. According to the ETSI standard, an M2M communication system may include an M2M network domain associated with a data collection/storage procedure, and a network application domain associated with a data request/utilization procedure. More specifically, the M2M network domain may collect M2M data (e.g., sensed data) using a plurality of M2M devices (e.g., sensors). The network application domain may request the collected M2M data to the M2M network domain. When receiving the M2M data in response from the M2M network domain, the network application domain may use the received M2M data according to service purposes.

In the M2M network, a data collection is performed by M2M devices and/or an M2M gateway. Such data collection may be performed according to a variety of schemes. For example, M2M devices may collect (or create) M2M data through a sensing procedure, and store the collected data. Alternatively, the M2M devices may transfer the collected (or created) M2M data to an M2M gateway to which the M2M devices are connected. In this case, the M2M gateway may collect M2M data from the M2M devices, and store the collected M2M data.

Such M2M data collection is performed using limited network resources. For example, with respect to the M2M data collection, there may be limitations such as (i) the limited number of M2M devices to be deployed for an M2M network, (ii) the limitation of an available electric power of each M2M device, (iii) an network environment implementation for collection of accurate data, (iv) a limited network bandwidth.

Furthermore, in the case that valueless data (or garbage data) such as overlapped data are collected, an M2M system may waste limited resources to collect and store the valueless data. Particularly, such collection and storage of the valueless data may result in a variety of problems in connection with a power consumption of M2M entities, a data storage, a data reliability (particularly, in case of a high quality multimedia service), use of network bandwidth, a device lifecycle, an expenditure associated with device deployment, and so forth.

Accordingly, it may be required to efficiently manage the limited network resources employed to collect M2M data. Particularly, in view of network management, it may be required to collect a variety of M2M data, and to obtain the M2M data including as much available information as possible.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, an efficient device management may be performed based on a correlation between M2M devices in an M2M network. Particularly, the present embodiment may control operations of M2M devices which perform an unnecessary (or garbage) data collection.

In accordance with at least one embodiment, a method may be provided for performing a device management in a machine to machine (M2M) network. The method may include collecting M2M data from a plurality of M2M devices, obtaining one or more correlation values between M2M devices included in a device group for a correlation calculation, and controlling an operation of at least one M2M device among M2M devices having a relatively greater correlation value.

The device group for the correlation calculation may be determined based on location information of each M2M device.

The obtaining may include extracting one or more data samples for each M2M device, through a data sampling of the M2M data, forming one or more data sample pairs for each M2M device pair, and calculating a correlation value using the one or more data sample pairs, per M2M device pair.

The data sampling may be performed according to a predetermined data set extraction period. Each data sample pairs may include two data samples, wherein a data collection time error of the two data samples is within a maximum time error range.

The method may further include determining a possibility of a data comparison per M2M device pair, based on at least one of a data type and a data parsing result.

The method may further include performing a data projection per M2M device pair.

The data comparison may be determined based on at least one of a content type and a data format.

The controlling may include selecting the at least one of M2M device for operation control, and controlling an operation of each of the selected M2M devices.

The selecting may be performed based on at least one of a device performance and an operation policy.

The operation policy may include priority information determined for each M2M device.

The controlling may include transiting the selected at least one M2M device to a sleep mode.

The controlling an operation of each of the selected M2M devices may include determining whether each correlation value satisfies an operation condition, identifying operation information corresponding to a satisfied operation condition, and controlling the operation of the selected M2M device, according to the operation information.

The at least one of the operation condition and the operation information may be determined based on an operation policy of a network operator.

The method may further include providing the one or more correlation values to an operator management server.

The collecting, the obtaining, and the controlling may be re-performed according to a correlation re-analysis period.

The method may further include waking up one or more M2M devices in a sleep mode, for a predetermined time period, such that a data collection is performed.

In accordance with another embodiment, an apparatus may be provided for performing a device management in a machine to machine (M2M) network. The apparatus may include a correlation analysis processor and an operation control processor. Herein, the correlation analysis processor may be configured to obtain one or more correlation values between M2M devices included in a device group for a correlation calculation. The operation control processor may be configured to control an operation of at least one M2M device among M2M devices having a relatively greater correlation value.

The device group for the correlation calculation may be determined based on location information of each M2M device.

The correlation analysis processor may be configured (i) to extract one or more data samples for each M2M device, through a data sampling of the M2M data, (ii) to form one or more data sample pairs for each M2M device pair, and (iii) to calculate a correlation value using the one or more data sample pairs, per M2M device pair.

The operation control processor may be configured (i) to determine whether each correlation value satisfies an operation condition, (ii) to identify operation information corresponding to a satisfied operation condition, and (iii) to control the operation of the selected M2M device, according to the operation information.

At least one of the correlation analysis processor and the operation control processor may be configured to re-perform according to a correlation re-analysis period.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
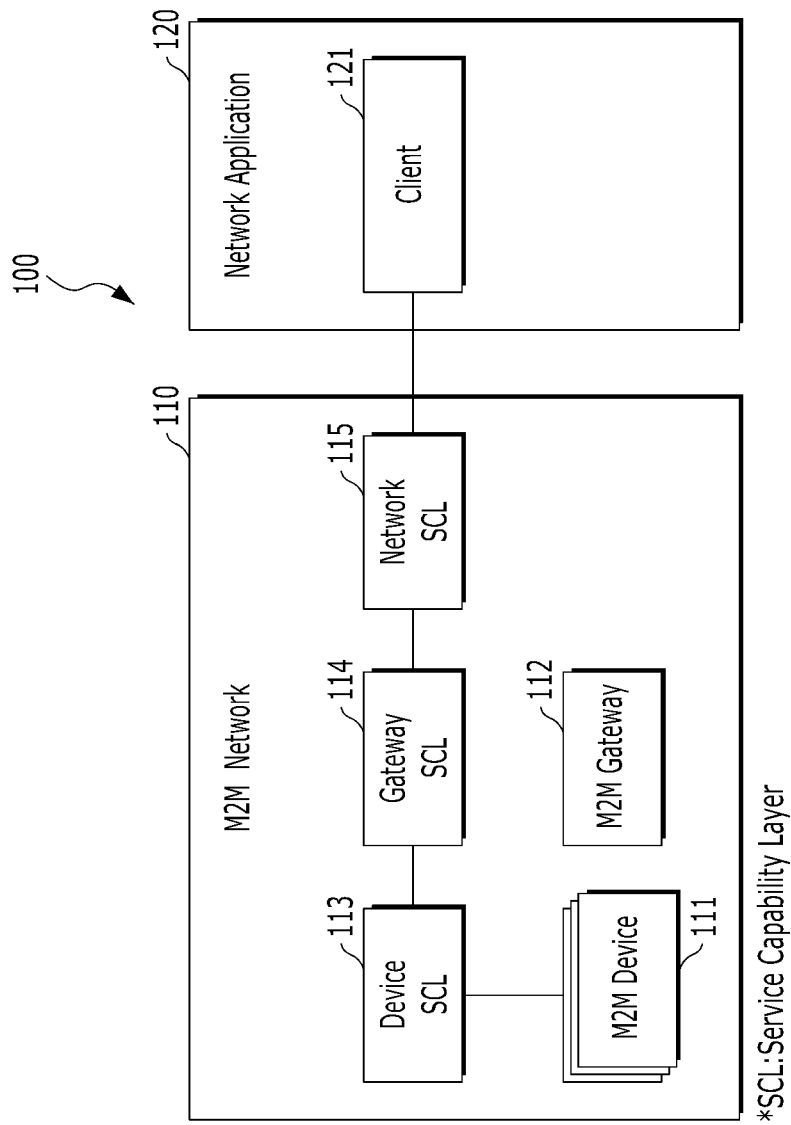
FIG. 1 illustrates an architecture of a typical M2M communication system.

Reference will now be made in detail to embodiments of the present invention, examples of which are illustrated in the accompanying drawings, wherein like reference numerals refer to like elements throughout. The embodiments are described below, in order to explain the present invention by referring to the figures.

The present embodiment may perform an efficient network management based on a correlation between M2M devices in an M2M network. Particularly, the present embodiment may control (e.g., stop) operations of M2M devices which perform an unnecessary data collection.

FIG. 1 illustrates an architecture of a typical M2M communication system.

As shown in FIG. 1, a typical M2M communication system such as M2M communication system 100 may include M2M network 110 and network application 120. In M2M communication system 100 according to the European Telecommunication Standards Institute (ETSI) standard, M2M network 110 may perform a data collection procedure and a data storing procedure. Meanwhile, network application 120 may perform a data retrieval procedure and use the retrieved data, in connection with a variety of services.

Referring to FIG. 1, M2M network 110 may one or more M2M devices 111, at least one M2M gateway 112, and a plurality of service capability layers (SCLs) 113 through 115. Herein, the plurality of service capability layers (SCLs) 113 through 115 may be referred to as a service layer. The service layer may include (i) device service capability layer (SCL) (or may referred to as "DSCL") 113 connected to M2M devices 111, (ii) gateway SCL (or may referred to as "GSCL") 114 connected to M2M gateway 112, and (iii) network SCL (or may referred to as "NSCL") 115. One or more device SCLs 113 may be registered in gateway SCL 114, and a plurality of gateway SCLs 114 may be registered in network SCL 115.

M2M gateway 112 may manage at least one connection between M2M gateway 112 and at least one M2M device 111, and collect M2M data (e.g., sensed data) created by each of M2M devices 111. Network SCL (NSCL) 115 may manage at least one connection between NSCL 115 and at least one M2M gateways 112. Eventually, the data collected by M2M gateway may be transferred to Network SCL (NSCL) 115.

In the ETSI standard, a storage medium (or a storage unit) for the collected M2M data are not defined or specified. Accordingly, a variety of medium may be employed for collecting and storing M2M data according to network implementation schemes of an M2M network operator. For example, device SCL 113, gateway SCL 114, and/or network SCL 115 may include a resource (e.g., a container) for storing M2M data (e.g., sensing data). More specifically, each SCL 113, 114, or 114 may include a storage unit in the resource (e.g., a container). In this case, M2M data stored in the storage unit of each SCL 113, 114, or 114 may be transferred to network application 120, in response to a data request message of client 121. When receiving the M2M data from M2M network 110, network application 120 may execute applications associated with a variety of services, using the received M2M data.

Referring back to FIG. 1, a data collection and transfer procedure may be performed according to a data request/response scheme. For example, M2M devices 111 may create M2M data through a measurement process (i.e., a sensing process), and transmit the M2M data (e.g., sensed data) to M2M gateway 114 according to a request of M2M gateway 114. In other words, M2M devices 111 may transmit the M2M data in response to the request of M2M gateway 114. The M2M data may be stored in a designated space of M2M gateway 114. Alternatively, M2M gateway 114 may receive M2M data using a 'subscribe' function. In this case, whenever new M2M data is created, M2M device 111 may send a notification to M2M gateway 114 or network SCL 115 in advance. When receiving the notification from M2M device 111, M2M gateway 114 or network SCL 115 may send a request for corresponding M2M data.

In an M2M network, a data processing procedure may be classified into the following three process: (i) a data collection (or an M2M data creation) process of M2M device 111 (e.g., sensors), (ii) a data storage process of each of device SCL 113, gateway SCL 114, and network SCL 115, and (iii) a data transfer process of transferring data through communication between device SCL 113, gateway SCL 114, network SCL 115, and client 121. Herein, since the data collection process was already described, the detailed description thereof is omitted. With respect to the data storage process, the collected (or created) M2M may be stored in each storage unit (e.g., a container) of device SCL 113, gateway SCL 114, and network SCL 115.

Hereinafter, detailed descriptions for an M2M data collection through a request/response process between network application 120 and M2M network 110 will be given.

Network application 120 may perform a series of procedures of searching functions and/or information of an M2M entity (e.g., M2M devices 111 or M2M gateway 112) that has already been connected to or is newly connected to M2M network 110. For this purpose, client 121 may create a request message (e.g., an HTTP request message) according to a predetermined scheme of network application 120, and send the created request message to M2M network 110 (e.g., network SCL 115). More specifically, the created request message may be transferred to a corresponding M2M entity (e.g., M2M device 111 or M2M gateway 112). Thereafter, client 121 may receive a response message responding to the request message, from M2M network 110 (e.g., network SCL 115), and interpret the received response message.

More specifically, network SCL (NSCL) 115 of M2M network 110 may receive the request message sent from client 121, and forward the received request message to a URI address designated by the request message. Through such routing procedures, the request message may be sent to a corresponding device SCL 113.

Device SCL (DSCL) 113 having received the request message may create a response message responding to the request message, and send the created response message to network application 120 through a reverse procedure. More specifically, the created response message may be sent to client 121 of network application 120.

When receiving the response message, client 121 of network application 120 may interpret the received response message, and perform a subsequent procedure using interpretation results.

As described above, a destination of a request message may be device SCL (DSCL) 113. In other examples, gateway SCL (GSCL) 114 or network SCL (NSCL) 115 may be a destination of a request message. In this case, gateway SCL 114 or network SCL 115 may create a response message and send the created response message to client 121 of network application 120.

Figure 2:
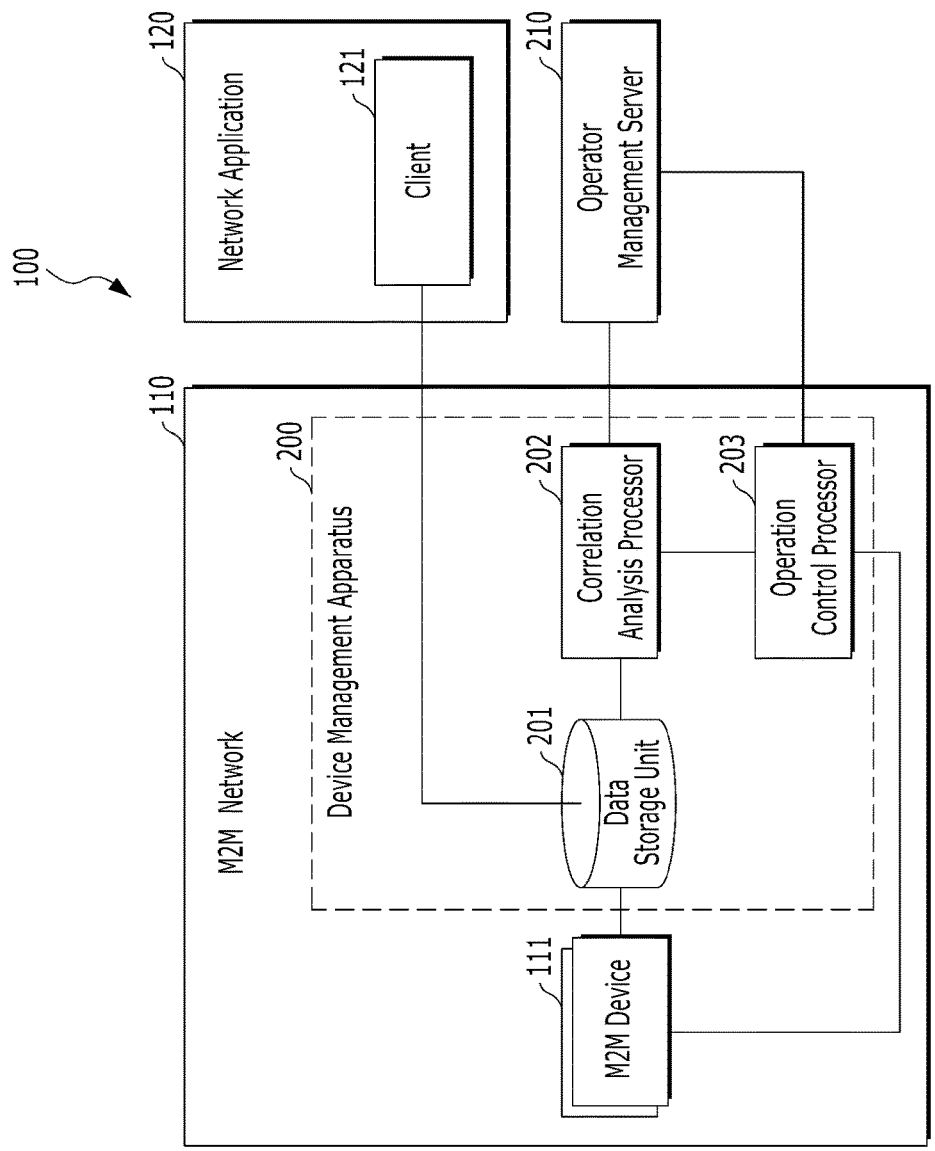
FIG. 2 illustrates a device management apparatus in an M2M communication system in accordance with at least one embodiment.

FIG. 2 illustrates a device management apparatus in an M2M communication system in accordance with at least one embodiment. More specifically, FIG. 2 illustrates interworking between an M2M network (e.g., 110) and an M2M application (e.g., 120) for performing a device management based on correlation between M2M devices in accordance with at least one embodiment.

As described above, M2M communication system 100 according to at least one embodiment may include M2M network 110 and network application 120. Herein, a procedure of collecting and storing M2M data may be performed in M2M network 110. Network application 120 may perform a data retrieval procedure and use the retrieved data, in connection with a variety of services.

M2M network 110 may one or more M2M devices 111, at least one M2M gateway 112 (not shown in FIG. 2), and a plurality of service capability layers (SCLs) 113 through 115 (not shown in FIG. 2). Herein, the plurality of service capability layers (SCLs) 113 through 115 may store and manage M2M data collected (or obtained) by M2M devices 111. The plurality of service capability layers (SCLs) 113 through 115 may be collectively referred to as xSCL. xSCL may be connected to M2M device 111, receive M2M data (e.g., sensed data) from M2M device 111, and store the received M2M data. In this case, the M2M data may be sequentially stored in device SCL 113, gateway SCL 114, and network SCL 115 according to stages of transferring the M2M data.

As shown in FIG. 2, device management apparatus 200 according to at least one embodiment may include data storage unit 201, correlation analysis processor 202, and operation control processor 203. Device management apparatus 200 may be implemented in connection with xSCL. More specifically, device management apparatus 200 may be implemented in connection with at least one device SCL 113, gateway SCL 114, and network SCL 115. For example, device management apparatus 200 may be implemented in gateway SCL 114. Alternatively, device management apparatus 200 may be implemented in network SCL 114. Accordingly, for convenience, device management apparatus 200 may be referred to as xSCL.

Referring back to FIG. 2, data storage unit 201 may store M2M data (e.g., sensed data) received from M2M device 111.

Correlation analysis processor 202 may analyze a correlation between the M2M data stored in data storage unit 201. Correlation analysis processor 202 may obtain at least one data sample (e.g., 401, 411, 421 in FIG. 4) by performing a partial sampling of M2M data (e.g., sensed data) which stored in data storage unit 201, at a predetermined time interval. Thereafter, correlation analysis processor 202 may analyze a correlation between M2M devices, using the obtained data samples. More specifically, input data of correlation analysis processor 202 may be the M2M data which were collected for a certain time period, among M2M data stored in data storage unit 201. In this case, correlation analysis processor 202 may support (or process) a variety of input data types. However, data types may be required to be standardized such that corresponding data can be processed in a data type check procedure and/or a data translation procedure. Correlation analysis processor 202 may obtain (or calculate) correlation values (which may be referred to as "correlation coefficients," or "correlation coefficient values") between specific M2M devices (e.g., M2M device 1 and M2M device 2 in FIG. 4), through a correlation analysis procedure. Herein, the correlation values may be obtained in a form of array. More specifically, a correlation value between M2M devices (e.g., M2M device 1 and M2M device 2 in FIG. 4) may represent a correlation value of data pairs (e.g., 40, 41, or 42 in FIG. 4) collected at specific time from the M2M. Such correlation analysis processor 202 will be described in more detail with reference to FIG. 3.

Meanwhile, operation control processor 203 may manage M2M devices (e.g., 111) and M2M resources according to an M2M network operation policy. Particularly, operation control processor 203 may manage (e.g., control) M2M devices (e.g., 111) and M2M resources, based on the analysis result of correlation analysis processor 202. More specifically, operation control processor 203 may manage (e.g., control) operations of one or more M2M devices, based on correlation values obtained by correlation analysis processor 202. Furthermore, interworking with a corresponding M2M device (e.g., 111) and/or network application 120 may be required for control of the corresponding M2M device. In this case, operation control processor 203 may include a common function for a mutual authentication. Operation control processor 203 may store a list about a variety of operations and/or an execution condition for each operation which are provided from operator management server 210. Furthermore, operation control processor 203 may store interfaces for interworking with operator management server 210. Such operation control processor 203 will be described in more detail with reference to FIG. 3.

Meanwhile, operator management server 210 may determine a variety of operation policies for management of M2M network 110, and provide the operation policies to device management apparatus 200. More specifically, operator management server 210 may determine a correlation analysis algorithm for correlation analysis processor 202, and a variety of parameters required for the correlation analysis algorithm. Accordingly, when analyzing a correlation between M2M devices, correlation analysis processor 202 may use the correlation analysis algorithm and the parameters determined in operator management server 210. In this case, analysis results may differ according to a correlation analysis algorithm and parameters employed for a correlation analysis. Furthermore, operator management server 210 may define and manage (i) device operations (i.e., operations of M2M devices) and (ii) one or more execution conditions (which may be referred to as "operation condition(s)") for each device operation. Herein, the device operations and the corresponding execution conditions (i.e., corresponding operation condition) may be defined in a form of pairs. Such device operations and execution conditions determined by operator management server 210 may be provided to device management apparatus 200 (more specifically, operation control processor 203). Accordingly, device management apparatus 200 (more specifically, operation control processor 203) may control operation of M2M device 111 based on (i) correlation values calculated by correlation analysis processor 202, and (ii) operation conditions determined by operator management server 210. More specifically, device management apparatus 200 (more specifically, operation control processor 203) may control operation of M2M device 111, according to whether a corresponding correlation value satisfies a corresponding operation condition. In addition, operator management server 210 may provide interfaces for interworking with operation control processor 203 such that operation policies can be applied to a device control of operation control processor 203.

Figure 3:
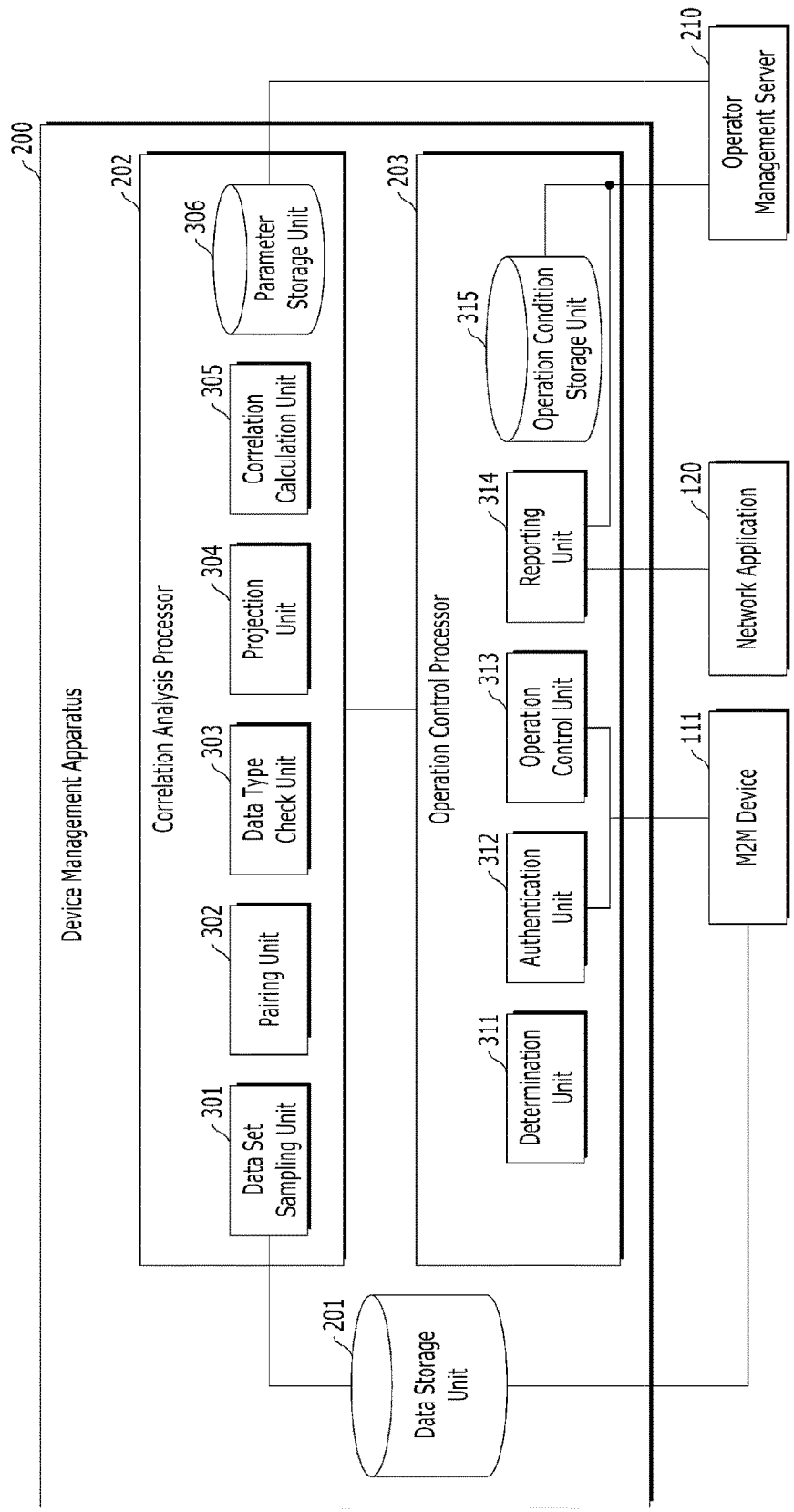
FIG. 3 illustrates a detailed structure of a device management apparatus in accordance with at least one embodiment.

FIG. 3 illustrates a detailed structure of a device management apparatus in accordance with at least one embodiment. Particularly, FIG. 3 illustrates a detailed structure of correlation analysis processor 202 and operation control processor 203.

As shown in FIG. 3, correlation analysis processor 202 may include a plurality of sub-processors, in order to analyze a correlation between the M2M data stored in data storage unit 201. More specifically, correlation analysis processor 202 may include data set sampling unit 301, pairing unit 302, data type check unit 303, projection unit 304, correlation calculation unit 305, and parameter storage unit 306.

Data set sampling unit 301 corresponding to a sub-processor may perform a partial sampling of M2M data (e.g., sensed data) which stored in data storage unit 201 at a predetermined time interval. More specifically, data set sampling unit 301 may extract data samples from M2M data of two or more M2M devices. For example, data set sampling unit 301 may extract data samples with reference to the predetermined parameters described in Table 1 below. Table 1 below may represent a variety of parameters employed for a correlation analysis between M2M devices.

TABLE 1

| Parameter Type | Description |
| --- | --- |
| Data set extraction period ($\Delta t$) | Time period for an extraction of a data set |
| Device group (G) | A group of M2M devices for a correlation analysis |
| Maximum time error range ($\Delta g$) | Maximum time error for pairing data samples |
| Correlation property | Device data property defined as correlation of the M2M devices |
| Algorithm | Definition of an algorithm employed for a correlation analysis |
| Correlation re-analysis period ($\Delta i$) | Time period when a correlation analysis is re-performed |

In Table 1 above, the "data set extraction period ($\Delta t$)" may represent a time period for an extraction of a data set. More specifically, the data set extraction period ($\Delta t$) may be a time period (i.e., a time period from a current time to a specific past time) for which a data set is extracted from M2M data stored in data storage unit 201. Herein, the data set may represent a set of data corresponding to the data set extraction period ($\Delta t$) (e.g., one week). The data set may correspond to a set of "input data" which is input to correlation analysis processor 202 for correlation analysis.

The "device group (G)" may represent a device list in which M2M devices for a correlation analysis are included. For example, a plurality of M2M devices may be grouped for a correlation analysis. In this case, M2M devices ($D_1$, $D_2$, $D_3$) for which a correlation analysis is performed together may be classified into the same group (e.g., $\{D_1, D_2, D_3\}$). More specifically, a device grouping may be performed based on locations of M2M devices.

The "maximum time error range ($\Delta g$)" may represent a maximum time error for pairing data samples. More specifically, the "maximum time error range (Δg)" may represent a range of time errors which can be handled as the M2M data collected at the same time. The "maximum time error range (Δg)" will be described in more detail with reference to FIG. 4.

The "correlation property" may represent a 'property' of M2M devices which is defined as correlation of the M2M devices. The "algorithm" may be used for defining an algorithm employed for a correlation analysis. The "correlation re-analysis period (Δi)" may represent a time period when a correlation analysis is re-performed. For example, in the case that the correlation re-analysis period (Δi) is a short period of time, network load and computation load may increase. In the case that the correlation re-analysis period (Δi) is a long period of time, necessary data may not be obtained. Accordingly, the correlation re-analysis period (Δi) may be required to be efficiently determined.

Figure 4:
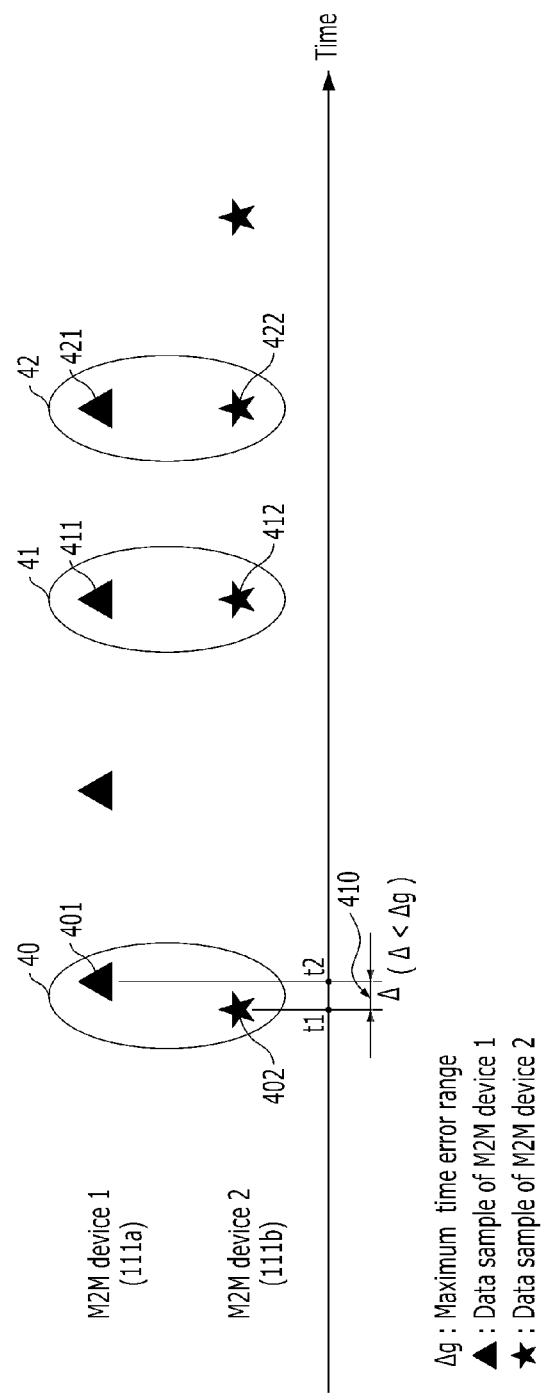
FIG. 4 illustrates performing a data sample pairing procedure for analyzing correlation between M2M devices in accordance with at least one embodiment.

Referring back to FIG. 3, data set sampling unit 301 may extract data samples from M2M data corresponding to the parameter "device group (G)." For example, in case of G={$D_1, D_2$}, as shown in FIG. 4, data set sampling unit 301 may extract data samples from M2M data corresponding to M2M device 1 and M2M device 2, among M2M data stored in data storage unit 201. More specifically, data samples may be obtained by retrieving a contentInstance resource of device SCL 113 in M2M device 111, per a sampling time.

Pairing unit 302 corresponding to a sub-processor may form data sample pairs (e.g., 40, 41, 42 in FIG. 4) for comparison, from data samples extracted by data set sampling unit 301. Pairing unit 302 may extract data sample pairs based on the maximum time error range (Δg). In this case, pairing unit 302 may extract every possible 'data sample pair.' Furthermore, a variety of data samples may be extracted according to a variety of sampling periods. A collection time period (i.e., a collection time interval) for M2M data may differ per each M2M device. Accordingly, the maximum time error range (Δg) for a data sample pairing may be required to efficiently determined. Such data sample pairing procedure will be described in more detail with reference to FIG. 4.

In the case that data sample pairs (e.g., 40, 41, 42 in FIG. 4) for data comparison are determined in paring unit 302, data type check unit 303 corresponding to a sub-processor may determine whether the data sample pairs are comparable, by checking data types (which may be referred to as "content types"). For example, as shown in FIG. 4, in the case that (i) data samples (e.g., 401, 411, 421) of M2M device 1 (111a) are image data having a certain resolution, and (ii) data samples (e.g., 402, 412, 422) of M2M device 2 (111b) are temperature data (e.g., temperature of a place where a temperature is installed), it may be meaningless to compare data samples between M2M device 1 (111a) and M2M device 2 (111b). Accordingly, data type check unit 303 may be required to check (or identify) whether two data samples (e.g., 401 vs 402) have comparable data types (i.e., content types), through a variety of schemes.

At least one embodiment, data type check unit 303 may check " . . . /contentInstance/content/contentType" attribute, and determine whether two character string are the same. For example, in the case that "contentType" of M2M device 1 (111a) and M2M device 2 (111b) are "jpg/image", two data samples may be comparable since two "contentInstance" of M2M device 1 (111a) and M2M device 2 (111b) correspond to image data. In this case, if the two data samples have different data types (i.e., different content types), the two data samples may not be comparable. In other embodiments, data type check unit 303 may determine whether two data samples are comparable, by parsing content data of M2M device 1 (111a) and M2M device 2 (111b). More specially, even in the case that two data content data (e.g., data samples of M2M device 1 and data samples of M2M device 2) included in a same data sample pair have the same data type (e.g., 'kg/image' format), the same resolution may be required to compare the two content data, according to comparison schemes. In this case, data type check unit 303 may identify corresponding resolutions by performing a decoding or parsing scheme suitable for "contentType." If a parsing process is not possible, corresponding two content data may not be comparable.

Projection unit 304 corresponding to a sub-processor may eliminate unnecessary data or reduce a data amount of the unnecessary data, through a data projection procedure. Herein, the unnecessary data may be data not required to perform a correlation analysis. The data projection procedure may project data in a certain domain onto another domain. For example, 3-dimensional (3D) data may be transformed into 2-dimentional (2D) data through the data projection procedure.

Correlation calculation unit 305 corresponding to a sub-processor may calculate a correlation value between M2M devices. Herein, a variety of typical correlation calculation schemes may be employed. Correlation calculation schemes may be variously defined according to device data properties. Furthermore, although the same correlation value is calculated, a calculation speed and a calculation amount may differ according to correlation algorithms. The correlation value may be used to determine a similarity degree between M2M data collected from a plurality of M2M devices (e.g., M2M device 1 and M2M device 2 in FIG. 4). For example, in the case that a correlation value calculated between M2M device 1 (111a) and M2M device 2 (111b) is relatively great, a similarity degree between M2M data collected from M2M device 1 (111a) and M2M device 2 (111b) may be determined to be relatively high. Accordingly, in this case, one of the two M2M device may be required to be controlled. Furthermore, as described in Table 1 above, a correlation between M2M devices may be defined based on a specific property of a plurality of properties associated with the M2M devices.

Parameter storage unit 306 corresponding to a sub-processor may store a variety of parameters and values thereof to be employed for a correlation analysis. For example, a variety of parameters described in Table 1 above may be stored in parameter storage unit 306.

Meanwhile, referring back to FIG. 3, operation control processor 203 may include a plurality of sub-processors. In other words, operation control processor 203 may control operations of a specific M2M device according to a correlation analysis result of correlation analysis processor 202. In this case, control schemes may be determined according to policies and/or requirements of an M2M network operator and/or a network application developer. More specifically, operation control processor 203 may include determination unit 311, authentication unit 312, operation control unit 313, reporting unit 314, and operation condition storage unit 315.

Determination unit 311 corresponding to a sub-processor may determine whether correlation values satisfy predetermined operation conditions. More specifically, when receiving correlation values from correlation analysis processor 202, determination unit 311 may determine whether the correlation values satisfy corresponding operation conditions. Herein, the operation conditions is stored in operation condition storage unit 315. For example, determination unit 311 may determine whether a correlation value is greater than a reference value defined by a corresponding operation condition. When the correlation value is greater than the reference value, correlation between corresponding M2M devices may be determined to be high. In this case, a higher correlation may mean that the M2M data collected from the two M2M devices are the same or quite similar.

Authentication unit 312 corresponding to a sub-processor may perform an authentication procedure for access M2M device 111 and/or network application 120. More specifically, when operation conditions are satisfied, authentication unit 312 may perform an authentication procedure such that operation control unit 313 can access M2M device 111 and/or network application 120, and/or can control operations of M2M device 111.

Operation control unit 313 corresponding to a sub-processor may control operations of one or more specific M2M devices. Operation control unit 313 may control operations of a specific M2M device according to determination results of determination unit 311. When a correlation value satisfies a corresponding operation condition, operation control unit 313 may analyze a corresponding device operation stored in operation condition storage unit 315, create a request message corresponding to a specific operation, and control a corresponding M2M device by transmitting the request message to the corresponding M2M device. Such control of device operations will be described in more detail with reference to FIG. 6. Furthermore, in the case that at least one of a device manage service, a service adjustment, and a resource update is required to be performed, operation control unit 313 may control a device operation by transmitting a request message to device SCL of a corresponding M2M device. In addition, operation control unit 313 may re-control a device operation of a specific M2M device. Such re-control of device operations will be described in more detail with reference to FIG. 7.

Figure 6:
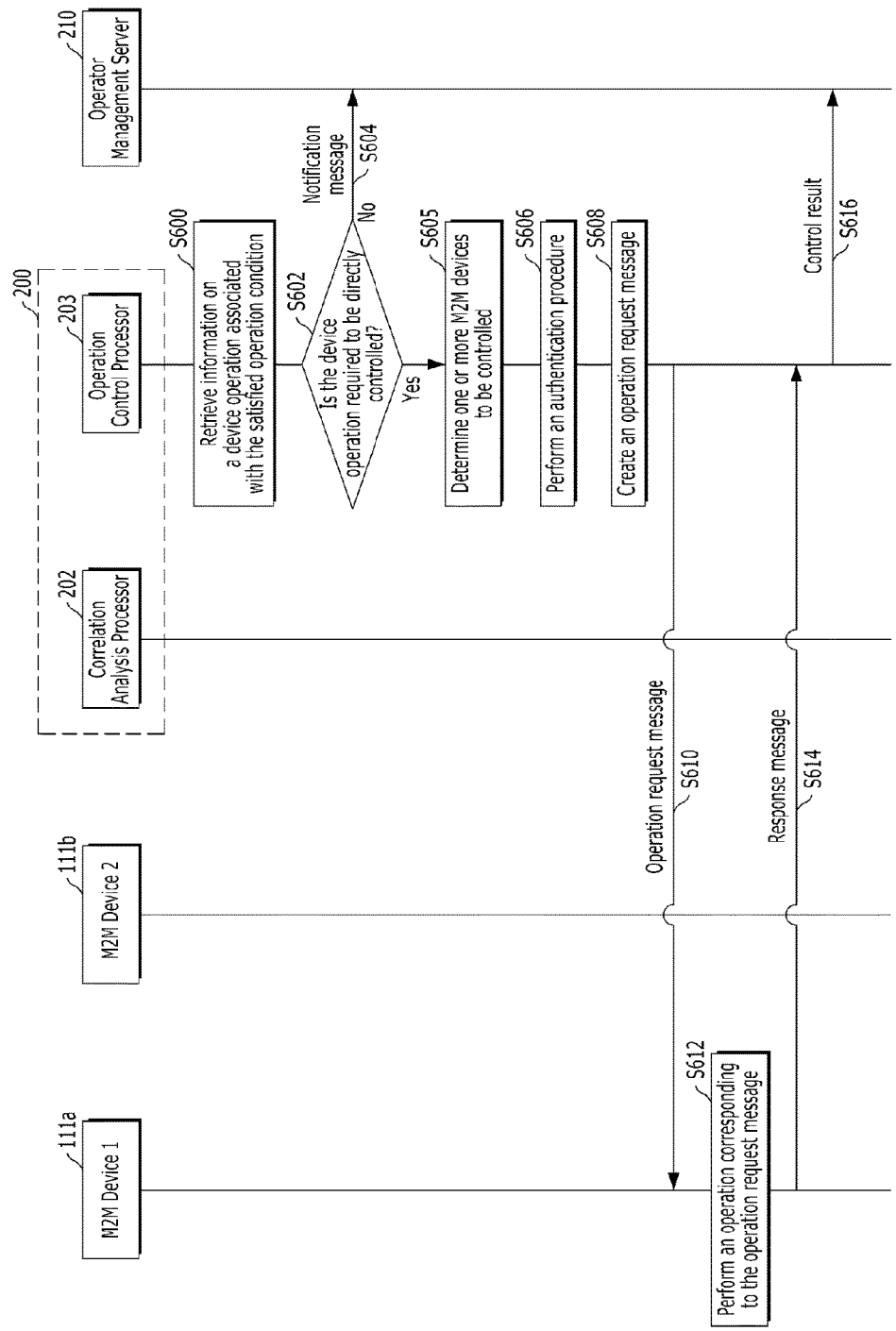
FIG. 6 illustrates a method of controlling a device operation according to a correlation analysis result in accordance with at least one embodiment.

FIG. 6 illustrates a method of controlling a device operation according to a correlation analysis result in accordance with at least one embodiment; and Reporting unit 314 corresponding to a sub-processor may transmit a notification to operator management server 210 when a correlation value is greater than a reference value. In this case, a 'subscribe' function and 'notify' message defined in the ETSI standard may be applied for reporting unit 314. In the case that a correlation value is greater than a reference value, a corresponding notification may represent that M2M network 110 is inefficiently operated or managed at a current time. Accordingly, when receiving the notification, a corresponding network operator may improve a network efficiency through re-deployment of one or more M2M devices and/or re-configuration of an M2M network. Furthermore, reporting unit 314 may provide a correlation calculation result and/or detailed information thereof to operator management server 210, along with the notification. In this case, a network operator may efficiently perform a device management in an M2M network, based on the correlation calculation result and/or detailed information thereof.

Operation condition storage unit 315 corresponding to a sub-processor may store information on specific device operations and operation conditions (i.e., one or more execution condition for each device operation). Herein, the device operations and/or operation conditions may be predetermined and provided by operator management server 210. The operation conditions may be defined based on correlation values. For example, when a correlation value (e.g., 0.98) between M2M device 1 and M2M device 2 is greater than a reference value (e.g., 0.95), one of the two M2M devices may be controlled such that a corresponding device state is changed from an active mode to a sleep mode. That is because the M2M data collected from the two M2M devices are the same or quite similar. In this case, "correlation value >0.95" and "the state change from an active mode to a sleep mode" may correspond to "an operation condition" and "a specific device operation," respectively. In other embodiments, the specific device operations to be executed according to whether operation conditions are satisfied may include a variety of operations determined according to operation policies of operators, such as a power-off operation, a state transition to a low-power mode, and so forth. In addition, device operations and operation conditions may be stored per M2M device or per M2M device group.

FIG. 4 illustrates performing a data sample pairing procedure for analyzing correlation between M2M devices in accordance with at least one embodiment.

Referring to FIG. 4, M2M data may be collected according to an elapse of time. For example, M2M data 401, 411, and 421 may be collected by M2M device 1 (111*a*) according to an elapse of time. M2M data 402, 412, and 422 may be collected by M2M device 2 (111*b*) according to an elapse of time.

As shown in FIG. 4, a plurality of data sample pairs (e.g., 40, 41, 42) may be formed for a correlation analysis. In this case, data sample pairs may be required to be formed such that a data collection time error ($\Delta$) 410 between M2M device 1 (111*a*) and M2M device (111*b*) does not exceed a maximum time error range ($\Delta$g). For example, data collection time error ($\Delta$) 410 may represent a difference value between a data collection time ($t_2$) of a data sample (e.g., 401) of M2M device 1 and a data collection time ($t_1$) of a data sample (e.g., 402) of M2M device 2. When the data collection time error ($\Delta$) (e.g., 410) does not exceed the maximum time error range ($\Delta$g), corresponding two data sample may be determined as "a data sample pair." For example, the data sample (e.g., 401) of M2M device 1 and the data sample (e.g., 402) of M2M device 2 may be determined as "a data sample pair (e.g., 40)."

Figure 5:
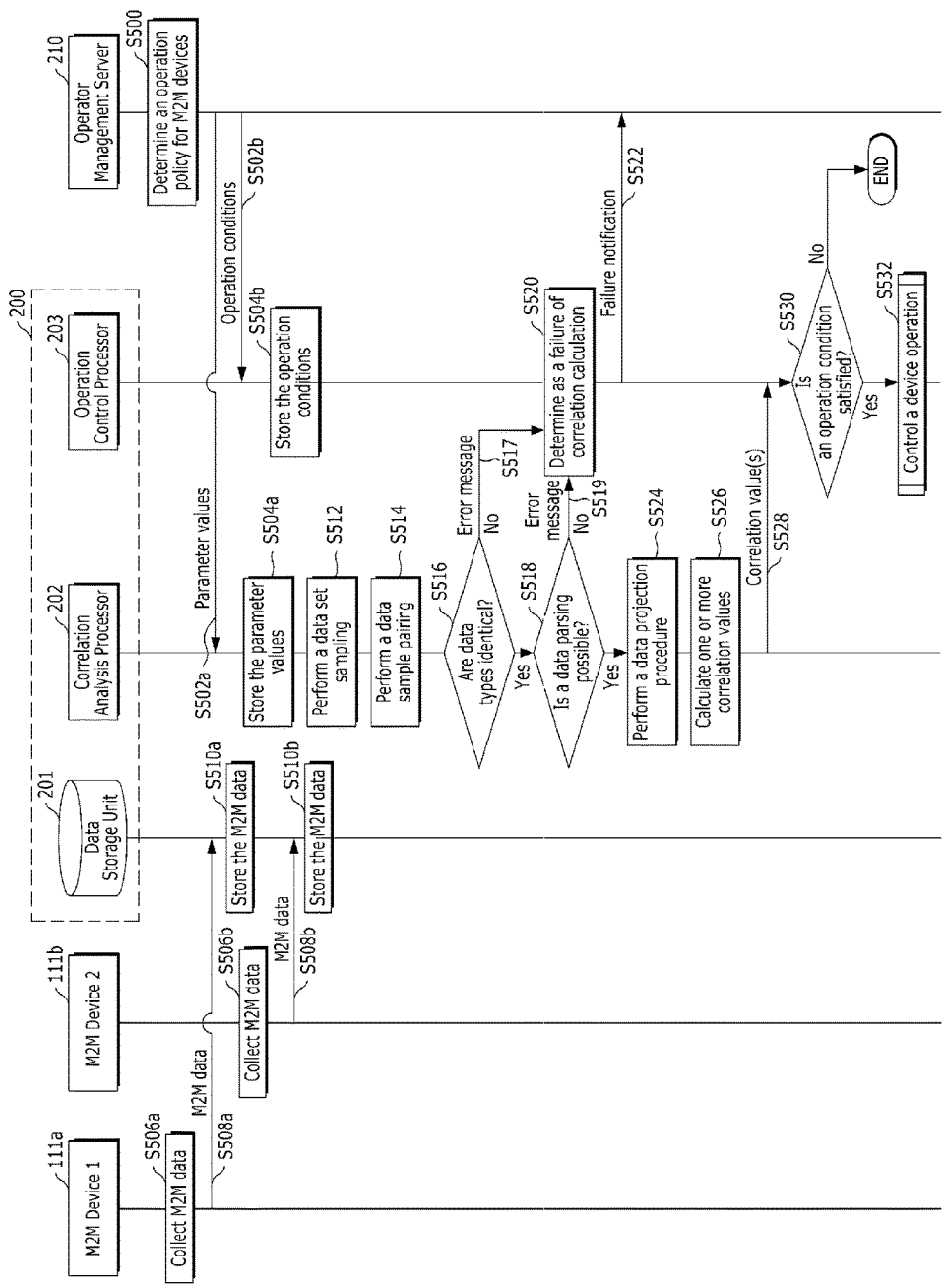
FIG. 5 illustrates a method of performing a device management based on a correlation between M2M devices in accordance with at least one embodiment.

FIG. 5 illustrates a method of performing a device management based on a correlation between M2M devices in accordance with at least one embodiment. Descriptions will be described under assumption that M2M device 1 (111*a*) and M2M device 2 (111*b*) are temperature sensors performing a temperature measurement at a predetermined time period, and a network operator managing an M2M network is a meteorological office (Met Office).

Referring to FIG. 5, at step S500, operator management server 210 may be a server operated by the Met Office managing a plurality of temperature sensors. Operator management server 210 may collect temperature information (e.g., sensed data) by connecting a plurality of M2M device 111 (e.g., temperature sensors) deployed in a certain area (e.g., Alexandria), through an M2M network.

In this case, the Met Office may determine (or establish) a variety of operation policies for management of M2M devices (e.g., temperature sensors), in order to improve a utilization efficiency of the M2M devices and reduce an electric power consumption amount of each M2M device. In other words, at step S500, operator management server 210 may determine (or establish) a variety of operation policies (i.e., device operation policies) for management of M2M devices 110*a* and 110*b* (e.g., temperature sensors).

For an example of the device operation policy, in the case that a correlation value between different M2M devices (e.g., M2M device 1 and M2M device 2) is greater than about "0.95", a sensing operation of one of the M2M devices may be controlled to stop and transit to a sleep mode (or awaiting mode). For another example of the device operation policy, a correlation value may be calculated based on M2M data which are collected from each M2M device for the past one hour from the current time. In this case, a variety of operation policies may be established that allow an error range (e.g., $\Delta g$ in Table 1) of data measurement of each M2M device to be up to about 0.01 [sec]. Such operation policy may include (i) a variety of operation conditions and/or (ii) a variety of parameter values as described in Table 1.

At step S502a, operator management server 210 may transmit the parameter values to correlation analysis processor 202. At step S502b, operator management server 210 may transmit the operation conditions to operation control processor 203.

At step S504a, when receiving the parameter values, correlation analysis processor 202 may store the received parameter values in parameter storage unit 306. Meanwhile, at step S504b, when receiving the operation conditions, correlation analysis processor 202 may store the received operation conditions in operation condition storage unit 315. More specifically, in the case that device management apparatus 200 is implemented in connection with at least one device SCL 113, gateway SCL 114, and network SCL 115, the parameter values and operation conditions may be stored in a corresponding SCL. For example, in the case that device management apparatus 200 is implemented in connection with network SCL 115, the parameter values and operation conditions may be stored in network SCL 115.

Meanwhile, at steps S506a and S506b, each of M2M device 1 (111a) and M2M device 2 (111b) may in real time or periodically collect M2M data (e.g., temperature data). Herein, the time period for collection of M2M data may be determined based on an operation property of M2M devices (e.g., 111a and 111b).

At steps S508a and S508b, each of M2M device 1 (111a) and M2M device 2 (111b) may transmit corresponding M2M data (e.g., temperature data) to device management apparatus 200.

At steps S510a and S510b, when receiving the M2M data from each of M2M device 1 (111a) and M2M device 2 (111b), device management apparatus 200 may store the received M2M in data storage unit 201. In other embodiment, data storage unit 201 may be implemented separately from device management apparatus 200.

As describe above, correlation analysis processor 202 may calculate one or more correlation values between M2M devices, based on the predetermined operation policy. In order to calculate one or more correlation values, correlation analysis processor 202 may perform pre-processing procedures (e.g., S512 through S524).

At step S512, correlation analysis processor 202 may perform a data set sampling procedure. More specifically, data set sampling unit 301 of correlation analysis processor 202 may perform a partial sampling of M2M data (e.g., sensed data) which stored in data storage unit 201 at a predetermined time interval. More specifically, data set sampling unit 301 may extract data samples from M2M data of M2M device 1 (111a) and M2M device 2 (111b). In this case, data set sampling unit 301 may extract data samples with reference to the predetermined parameters (e.g., data set extraction period ($\Delta t$), device group (G), etc.) described in Table 1 above. For example, data set sampling unit 301 may extract data samples (e.g., 401, 411, 421 in FIG. 4) from M2M data of M2M device 1 (111a). Data set sampling unit 301 may extract data samples (e.g., 402, 412, 422 in FIG. 4) from M2M data of M2M device 2 (111b).

For another example, when receiving temperature data from a plurality of temperature sensors, correlation analysis processor 202 may extract temperature data corresponding to the parameter "data set extraction period ($\Delta t$)" (e.g., 1 hour) from the received temperature data. Herein, the extracted temperature data may be referred to as "data sample set" The data sample set may be obtained through a command defined by Formula 1 below.

/<sclBase>/ . . . /ContentInstances/RETRIEVE(filter-criteria:createdAfter($\Delta t$))      [Formula 1]

M2M data collected from M2M devices may have a structure where for each M2M device, a contentInstances resource includes a plurality of <contentInstance> as sub-resources.

At step S514, correlation analysis processor 202 may perform a data sample pairing procedure. More specifically, pairing unit 302 of correlation analysis processor 202 may form one or more data sample pairs (e.g., 40, 41, 42 in FIG. 4) for comparison, from data samples extracted at step S512. Particularly, pairing unit 302 may extract data sample pairs based on the maximum time error range ($\Delta g$), in order to obtain M2M data associated with the same time. Data samples (401 and 402 in FIG. 4) associated with the same time may be compared each other. In case of the above example, pairing unit 302 may create one or more <contentInstance> pairs based on the maximum time error range ($\Delta g$). Two M2M data for correlation may be retrieved from a contentInstances resource. In this case, the sample pairing procedure may be performed, by comparing createdTime corresponding to an attribute value of <contentInstance> in two contentInstances.

For example, as shown in FIG. 4, in the case that a data collection time error ($\Delta$) 410 between data sample 401 and data sample 402 does not exceed a maximum time error range ($\Delta g$), both data sample 401 and data sample 402 may form a data sample pair (e.g., 40).

At steps S516 and S518, correlation analysis processor 202 (more specifically, data type check unit 303) may determine whether two data samples (401 and 402) included in a data sample pair (e.g., 40) can be compared.

More specifically, at step S516, data type check unit 303 may determine whether two data samples (401 and 402) included in a data sample pair (e.g., 40) can be compared by checking data types (which may be referred to as "content types"). In other words, in the case that two <contentInstance> forming a data sample pair are obtained, correlation analysis processor 202 (more specifically, data type check unit 303) may determine a comparability of two data samples, by comparing contentType of <contentInstance> as described in Formula 2 below.

/<sclBase>/ . . . /ContentInstances/ContentInstance/Content/ContentType      [Formula 2]

In Formula 2, for example, in the case that "contentType" of <contentInstance> of two M2M devices (e.g., M2M device 1 and M2M device 2) is "jpg/image", two data samples may be comparable since the two data samples correspond to image data.

At step S517, when the two data samples have different data types (i.e., different content types) (No-S516), correlation analysis processor 202 may send an error message to operation control processor 203 (more specifically, reporting unit 314). At step S520, operation control processor 203 (more specifically, reporting unit 314) may determine that a correlation calculation failed. At step S522, operation control processor 203 (more specifically, reporting unit 314) transmit a failure notification to operator management server 210.

At step S518, when the two data samples have identical data types (i.e., different content types) (Yes-S516), correlation analysis processor 202 (more specifically, data type check unit 303) may determine whether a data parsing is possible. For example, in the case that each data sample is a mere data string, it may be difficult to recognize a corresponding data format in advance without parsing. Accordingly, in this case, it may be required to determine whether the data sample is properly parsed. Furthermore, even in the case that two content data (e.g., data samples of M2M device 1 and data samples of M2M device 2) included in a same data sample pair have the same data type (e.g., 'kg/image' format), the same resolution may be required to compare the two content data, according to comparison schemes. In this case, correlation analysis processor 202 may identify corresponding resolutions by performing a decoding or parsing scheme suitable for "contentType." If a parsing process is not possible, corresponding two content data may not be comparable.

At step S519, when the data parsing is impossible (No-S518), correlation analysis processor 202 may send an error message to operation control processor 203 (more specifically, reporting unit 314). At step S520, operation control processor 203 (more specifically, reporting unit 314) may determine that a correlation calculation failed. At step S522, operation control processor 203 (more specifically, reporting unit 314) transmit a failure notification to operator management server 210.

At step S524, when the data parsing is possible (Yes-S524), correlation analysis processor 202 (more specifically, projection unit 304) may perform a data projection procedure. More specifically, projection unit 304 of correlation analysis processor 202 may eliminate unnecessary data or reduce a data amount of the unnecessary data, through a data projection procedure. In other words, the data projection procedure may be required to perform such correlation values can be obtained using only M2M data which a network operator wants. Herein, the unnecessary data may be data not required to perform a correlation analysis. The data projection procedure may project data in a certain domain onto another domain. For example, 3-dimensional (3D) data may be transformed into 2-dimentional (2D) data through the data projection procedure.

For another example, in the case that a network operator is the Met office, correlation values may be calculated based on absolute values of temperature data. Alternatively, correlation values may be required to calculate based on temperature difference values per time interval (i.e., time slot). In this case, when temperature difference values per time interval are the same between two temperature data, it may be determined as "a high correlation." For this, a projection of an absolute value space (i.e., a space formed by absolute values of temperature) onto a difference value space (i.e., a space formed by difference values of temperature per time interval) may be required to perform. In other embodiments, collected M2M data may be projected onto a lower-dimensional space, or be normalized.

At step S526, if the projection procedure of operation S524 is complete, correlation analysis processor 202 (more specifically, correlation calculation unit 305) may calculate a correlation value, using sample data which are selected or transformed through the data projection procedure. Correlation calculation unit 305 of correlation analysis processor 202 may calculate correlation values between M2M devices, using a variety of parameter values (e.g., values of parameters described in Table 1) in stored in parameter storage unit 306. Herein, a variety of typical correlation calculation schemes may be employed. Correlation calculation schemes may be variously defined according to device data properties. Furthermore, although the same correlation value is calculated, a calculation speed and a calculation amount may differ according to correlation algorithms. The correlation value may be used to determine a similarity degree between M2M data collected from a plurality of M2M devices (e.g., M2M device 1 and M2M device 2 in FIG. 4). For example, in the case that a correlation value calculated between M2M device 1 (111a) and M2M device 2 (111b) is relatively great, a similarity degree between M2M data collected from M2M device 1 (111a) and M2M device 2 (111b) may be determined to be relatively high. Accordingly, in this case, one of the two M2M device may be required to be controlled. Furthermore, as described in Table 1 above, a correlation between M2M devices may be defined based on a specific property of a plurality of properties associated with the M2M devices.

For example, in case of three temperature sensors (x, y, z), three correlation values (e.g., xPy, yPz, xPz) may be calculated for each data sample pair (e.g., x-y, y-z, x-z). Herein, xPy may represent a correlation value between temperature sensor 'x' and temperature sensor 'y'. yPz may represent a correlation value between temperature sensor 'y' and temperature sensor 'z'. xPz may represent a correlation value between temperature sensor 'x' and temperature sensor 'z'.

At step S528, correlation analysis processor 202 may transfer the calculated correlation value(s) to operation control processor 203.

At step S530, when receiving correlation value(s) from correlation analysis processor 202, operation control processor 203 (more specifically, determination unit 311) may determine whether the correlation value(s) satisfy an operation condition. In other words, determination unit 311 of operation control processor 203 may determine whether the correlation value(s) satisfy one or more operation conditions, based on control condition pairs (i.e., device operations, and execution conditions therefor) stored in operation condition storage unit 315.

More specifically, determination unit 311 of operation control processor 203 may determine whether a correlation value is greater than a reference value defined by a corresponding operation condition. For example, in the case that an operation condition for a specific M2M device is P>0.95, and a correlation value (xPy) between temperature sensor 'x' and temperature sensor 'y' is 0.98, it may mean that the M2M data collected from the two temperature sensors are the same or quite similar.

At step S532, when the correlation value(s) satisfy an operation condition (Yes-S530), operation control processor 203 may control operations of a specific M2M device according to determination results of determination unit 311. Such control procedure (S532) will be described in more detail with reference to FIG. 6. Meanwhile, when the correlation value(s) does not satisfy operation conditions (No-S530), a device management procedure may end.

FIG. 6 illustrates a method of controlling a device operation according to a correlation analysis result in accordance with at least one embodiment. Particularly, FIG. 6 illustrates a detailed procedure of operation S532.

Referring to FIG. 6, operation control processor 203 may control operations of one or more specific M2M device according to correlation analysis result (e.g., correlation values). Device operations to be controlled may be determined based on requirements of an M2M network operator and/or a network application developer.

At step S600, operation control processor 203 may retrieve information on a device operation associated with the satisfied operation condition (Yes-S530). More specifically, determination unit 311 may retrieve (or obtain) information on the device operation of a specific M2M device associated with the satisfied operation condition, by comparing the correlation value(s) (i.e., the correlation value(s) received from correlation analysis processor 202 at step S528) and control condition pairs (i.e., device operations, and execution conditions therefor) stored in operation condition storage unit 315.

At step S602, operation control processor 203 may determine whether the corresponding device operation is required to be directly controlled. For example, even in the case that the correlation value(s) is greater than a predetermined reference value, the corresponding operation may be predetermined as "reporting to operator management server 210" by an operation policy. In this case, although the correlation value(s) is greater than a predetermined reference value, operation control processor 203 may be required to merely transmit the correlation calculation result to operator management server 210 without directly controlling operations of corresponding M2M devices.

At step S604 when the corresponding device operation is not required to be directly controlled (No-S602), operation control processor 203 may transmit a notification message to operator management server 210. Herein, the notification message may include a corresponding correlation value, and be transmitted through reporting unit 314. When the received corresponding correlation value is greater than the predetermined reference value, operator management server 210 may recognize that corresponding M2M devices are inefficiently deployed, and perform re-deployment of the corresponding M2M devices.

At step S605, when the corresponding device operation is required to be directly controlled (Yes-S602), operation control processor 203 may determine one or more M2M devices to be controlled. For example, in the case that there are M2M device 1 (111a) and M2M device 2 (111b), an M2M device to be controlled may be determined as "M2M device 1 (111a)" based on a device performance and/or an operation policy (e.g., a predetermined priority).

At step S606, operation control processor 203 may perform an authentication procedure for access the M2M device (e.g., M2M device 1 (111a)) to be controlled. In other words, authentication unit 312 may perform an authentication procedure such that operation control unit 313 can access M2M device 111a and/or can control operations of M2M device 111a. For example, operation control processor 203 may obtain an authorization for controlling a device operation of a corresponding M2M device (e.g., M2M device 1 (111a)), through authentication unit 312. More specifically, authentication unit 312 may request (i) a key value for authentication and (ii) authorization for a device operation control, to a corresponding M2M device (e.g., M2M device 1 (111a) such as a temperature sensor). In the case that M2M devices are temperature sensors, authentication unit 312 may obtain a token for control of the temperature sensors by performing a series of message exchange procedures in connection with temperature sensors. In this case, the authentication procedure may be a procedure defined according to the ETSI M2M standard.

At step S608, after the authentication procedure is successfully performed, operation control processor 203 (more specifically, operation control unit 313) may create an operation request message. More specifically, operation control processor 203 may control operations of one or more specific M2M devices (e., M2M device 1 (111a) determined at step S605), through interworking with the specific M2M device(s) (e.g., M2M device 1 (111a). Operation control unit 313 of operation control processor 203 may create the operation request message to control the specific operation(s) of the specific M2M device(s) (e.g., M2M device 1 (111a), based on information (e.g., device operations for execution, and operation condition for execution the device operations) stored in operation condition storage unit 315. Herein, the operation request message may be referred to as "update request message" according to embodiments. For example, the operation request message may be formed as an update request message (or resource update request message) as described in Formula 3 below.

$$\text{<sclBase>/scls/<scl>/<mgmtCmd>/UPDATE turnoff} \quad \text{[Formula 3]}$$

At step S610, operation control processor 203 may transmit the created operation request message to the specific M2M device(s) (e.g., M2M device 1 (111a)) to be controlled.

At step S612, when receiving the operation request message from operation control processor 203, M2M device 1 (111a) may perform an operation corresponding to the operation request message. For example, receiving the update request message described in Formula 3 from operation control processor 203, M2M device 1 (111a) may perform a resource update for control of a specific operation requested through the update request message. For an example of operations of control temperature sensors, operation control unit 313 of operation control processor 203 may request an execution of "sleep mgmtCmd" to a specific temperature sensor such that the specific temperature sensor transits to a sleep mode. In this case, the specific temperature sensor may configure a sub-resource for transition to a sleep mode, under the device resource "msmtObj" as described in Formula 4 below, by performing a resource update according to a corresponding update request message.

$$\text{<sclBase>/mgmtObj/<mgmtCmd>/execInstances/<execInstance>} \quad \text{[Formula 4]}$$

According to the ETSI standard, when executing a certain command for an M2M device management, the command may be abstracted into <mgmCmd>. When <mgmCmd> is executed, "execInstance" may be created. In case of a temperature sensor, <mgmCmd> may correspond to "a transition to a sleep mode". When <mgmCmd> corresponding to "a transition to a sleep mode," "execInstance" for a corresponding execution instance may be created, and therefore an execution time and a current state may be managed.

At step S614, M2M device 1 (111a) may transmit a response message to operation control processor 203. When a specific operation corresponding to an operation request message is performed through a resource update as described in Formula 4 above, M2M device 1 (111a) may transmit the response message in response to the operation request message. Herein, the response message may include a control result (a processing result according to the operation request message).

At step S616, when receiving the response message from M2M device 1 (111a), operation control processor 203 may transmit a control result to operator management server 210. Operation control processor 203 may check (or ascertain) the control result through the response message received from M2M device 1 (111*a*), and transmit the control result to operator management server 210, through reporting unit 314.

As described above, in the case that M2M data collected a plurality of M2M devices are determined to be the substantially same data based on correlation values, device management apparatus 200 may determine (i) one or more M2M devices to collect M2M data, and (ii) one or more M2M devices for control of corresponding device operations (e.g., one or more M2M devices to be transited to a sleep mode), and control M2M devices according to the determination results. Environmental factors (e.g., weather) associated with M2M devices may be changed. Accordingly, a continuous management for M2M devices may be required. In other words, a method (i.e., a method shown in FIG. 6) of controlling a device operation according to a correlation analysis result may be required to be repetitively performed.

Figure 7:
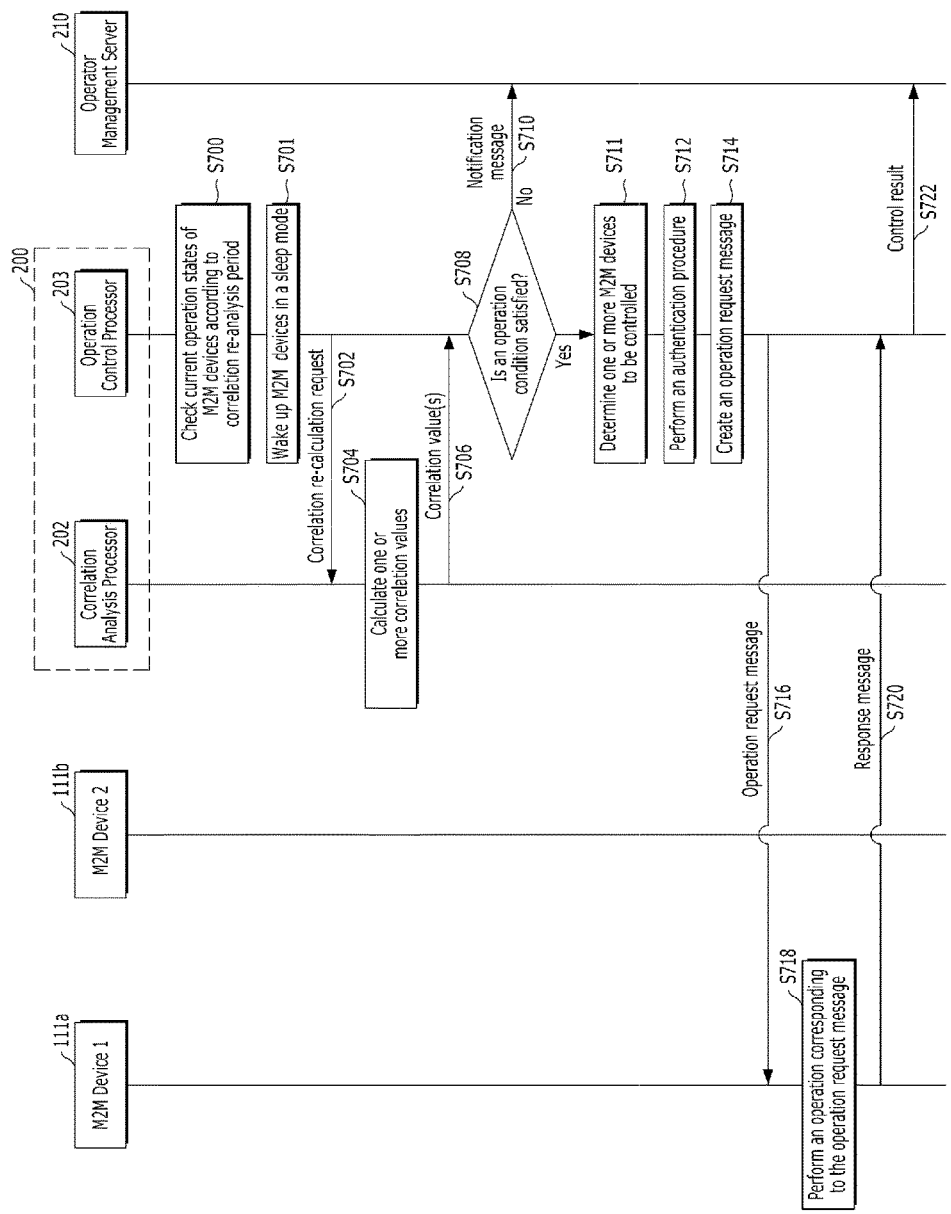
FIG. 7 illustrates a method of re-controlling a device operation by re-performing a correlation analysis in accordance with another embodiment.

FIG. 7 illustrates a method of re-controlling a device operation by re-performing a correlation analysis in accordance with another embodiment.

Referring to FIG. 7, at step S700, operation control processor 203 may check current operation states of M2M devices according to a predetermined time period (i.e., correlation re-analysis period ($\Delta i$) described in Table 1). More specifically, operation control processor 203 may determine (i) whether there are currently executing operations and/or (ii) a state of each of the currently executing operations, per each M2M device.

At step S701, operation control processor 203 may temporarily (i.e., for a predetermined time period) wake up M2M devices (e.g., M2M device 1 (111*a*) transited to a sleep mode in FIG. 6) in a sleep mode such that a data re-collection and a correlation re-analysis can be performed. M2M data newly collected from M2M devices (e.g., M2M device 1 and M2M device 2) may be stored in data storage unit 201. The newly collected M2M data may be used for a correlation re-analysis.

At step S702, operation control processor 203 may transmit a correlation re-calculation request message to correlation analysis processor 202. Herein, the correlation re-calculation request message may include the check result (S700).

At step S704, when receiving the correlation re-calculation request message from operation control processor 203, correlation analysis processor 202 (more specifically, correlation calculation unit 305) may calculate one or more correlation values between M2M devices. In at least one embodiment, correlation analysis processor 202 may entirely re-perform a correlation analysis as shown in FIG. 6. That is, correlation analysis processor 202 may re-perform a correlation analysis for all M2M devices corresponding to the parameter "device group (G)". In other embodiments, correlation analysis processor 202 may re-perform a correlation analysis for only M2M devices where operations are currently being executed. Since the correlation calculation procedure was already described with reference to FIG. 2 to FIG. 5 (especially, S512 to s526), detailed descriptions thereof will be omitted.

At step S706, correlation analysis processor 202 may transfer the calculated correlation value(s) to operation control processor 203.

At step S708, when receiving correlation value(s) from correlation analysis processor 202, operation control processor 203 (more specifically, determination unit 311) may determine whether the correlation value(s) satisfy an operation condition. In other words, determination unit 311 of operation control processor 203 may determine whether the correlation value(s) satisfy one or more operation conditions, based on (i) control condition pairs (i.e., device operations, and execution conditions therefor) stored in operation condition storage unit 315 and (ii) newly calculated correlation values.

At step S710, when the correlation value(s) does not satisfy an operation condition (No-S708), operation control processor 203 may transmit a notification message to operator management server 210. Herein, the notification message may include corresponding correlation values.

At step S711 when the correlation value(s) satisfies an operation condition (Yes-S708), operation control processor 203 may determine one or more M2M devices to be controlled. For example, in the case that there are M2M device 1 (111*a*) and M2M device 2 (111*b*), an M2M device to be controlled may be determined as "M2M device 1 (111*a*)" based on a device performance and/or an operation policy (e.g., a predetermined priority).

Hereinafter, the operations of steps S712, S714, S716, S718, S720, and S722 are substantially identical or similar to those of steps S606, S608, S610, S612, S614, and S616 of FIG. 6. The following description will focus on differences between FIG. 6 and FIG. 7 for convenience.

At step S712, operation control processor 203 may perform an authentication procedure for access the M2M device (e.g., M2M device 1 (111*a*)) to be controlled. More specifically, authentication unit 312 may perform an authentication procedure such that operation control unit 313 can access M2M device 1 (111*a*) and/or can control operations of M2M device 1 (111*a*).

At step S714, operation control processor 203 may create an operation request message. For example, operation control processor 203 may create an operation request message for deleting resource information associated with 'a transition to a sleep mode' such that an operation state of a corresponding M2M device (e.g., M2M device 1) in a sleep mode can transit back to an active mode.

At step S716, operation control processor 203 may transmit the created operation request message to the M2M device 1 (111*a*) to be controlled.

At step S718, when receiving the operation request message from operation control processor 203, M2M device 1 (111*a*) may perform an operation corresponding to the operation request message. For example, M2M device 1 (111*a*) may transit to an active mode, by deleting resources configured according to Formula 4 above. In other words, M2M device 1 (111*a*) may perform a resource update by deleting <execInstance> included in mgmtObj, among resource information for transition to a sleep mode (e.g., <sclBase>/mgmtObj/<mgmtCmd>/execInstances/<execInstance>).

At step S720, M2M device 1 (111*a*) may transmit a response message to operation control processor 203 (more specifically, operation control unit 313). Herein, the response message may include a result of operation S718.

At step S722, when receiving the response message from M2M device 1 (111*a*), operation control processor 203 may transmit a control result to operator management server 210. More specifically, operation control processor 203 may transmit the control result to operator management server 210, through reporting unit 314. For example, in the case that a specific temperature sensor transits from a sleep mode back to an active mode, the control result may include information on the device state change.

As described above, the present embodiment may minimize an unnecessary use of resources by stopping an operation of an M2M device which performs an unnecessary data collection (or a garbage data collection).

Furthermore, the present embodiment may provide (i) information on M2M devices performing an unnecessary data collection and/or (ii) correlation values corresponding to unnecessary M2M devices, to a network operator. Accordingly, the deployment and operations of M2M devices in an M2M network may be optimally realized. In other words, the present embodiment may enable an M2M system to efficiently and maximally collect M2M data through limited resources of an M2M network. In addition, the present embodiment may reduce an unnecessary operation time of M2M devices, thereby reducing the operation expenditure of an M2M network and extending the lifetime of M2M devices.

In addition, the present embodiment may minimize use of a storage unit, by performing a device deployment strategy for maximizing a collected data amount, and a mutual compression for overlapped data in the storage unit.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of performing a device management in a machine to machine (M2M) network, the method comprising:
   collecting M2M data from a plurality of M2M devices;
   based on the collected M2M data, obtaining one or more correlation values between M2M devices included in a device group; and
   controlling an operation of at least one M2M device among MINI devices having a relatively greater correlation value than a reference value, wherein the obtaining includes:
  extracting data samples for each M2M device, through a data sampling of the M2M data;
  forming data sample pairs for each M2M device pair; and
  calculating a correlation value using the data sample pairs, per M2M device pair, and
wherein the controlling an operation of each of the selected M2M devices includes:
  determining whether each correlation value satisfies an operation condition;
  identifying operation information corresponding to a satisfied operation condition; and
  controlling the identified operation of the selected M2M device, according to the operation information.

2. The method of claim 1, wherein the device group for the correlation calculation is determined based on location information of each M2M device.

3. The method of claim 1, wherein:
  the data sampling is performed according to a predetermined data set extraction period; and
  each data sample pairs includes two data samples, wherein a data collection time error of the two data samples is within a maximum time error range.

4. The method of claim 1, further comprising at least one of:
  (i) determining a possibility of a data comparison per M2M device pair, based on at least one of a data type and a data parsing result; and
  (ii) performing a data projection per M2M device pair.

5. The method of claim 1, wherein the data comparison is determined based on at least one of a content type and a data format.

6. The method of claim 1, wherein the controlling includes:
  selecting the at least one of M2M device for operation control; and
  controlling an operation of each of the selected M2M devices.

7. The method of claim 6, wherein the selecting is performed based on at least one of a device performance and an operation policy.

8. The method of claim 7, wherein the operation policy includes priority information determined for each M2M device.

9. The method of claim 6, wherein the controlling includes:
  transiting the selected at least one M2M device to a sleep mode.

10. The method of claim 1, wherein at least one of the operation condition and the operation information is determined based on an operation policy of a network operator.

11. The method of claim 1, further comprising:
  providing the one or more correlation values to an operator management server.

12. The method of claim 1, wherein the collecting, the obtaining, and the controlling are re-performed according to a correlation re-analysis period.

13. The method of claim 12, further comprising:
  waking up one or more M2M devices in a sleep mode, for a predetermined time period, such that a data collection is performed.

14. An apparatus for performing a device management in a machine to machine (M2M) network, the apparatus comprising:
  a data storage configured to receive M2M data from a plurality of M2M devices and store the received M2M data;
  a correlation analysis processor configured to obtain correlation values, from the stored M2M data, between M2M devices included in a device group; and
  an operation control processor configured to control an operation of at least one M2M device among M2M devices having a relatively greater correlation value than a reference value,
wherein the correlation analysis processor is configured to:
  (i) extract data samples for each M2M device, through a data sampling of the M2M data;
  (ii) form data sample pairs for each M2M device pair; and
  (iii) calculate a correlation value using the data sample pairs, per M2M device pair, and
wherein the operation control processor is configured to:
  (i) determine whether each correlation value satisfies an operation condition;
  (ii) identify operation information corresponding to a satisfied operation condition; and
  (iii) control the operation of the selected M2M device, according to the operation information.

15. The apparatus of claim 14, wherein the device group for the correlation calculation is determined based on location information of each M2M device.

16. The apparatus of claim 14, wherein at least one of the correlation analysis processor and the operation control processor is configured to re-perform according to a correlation re-analysis period.

* * * * *

UNITED STATES PATENT AND TRADEMARK OFFICE
CERTIFICATE OF CORRECTION

PATENT NO.        : 10,374,911 B2
APPLICATION NO.   : 14/190602
DATED             : August 6, 2019
INVENTOR(S)       : Hwi-Jung Ryu et al.

Page 1 of 1

It is certified that error appears in the above-identified patent and that said Letters Patent is hereby corrected as shown below:

In Claim 1, Column 22, Line 66, please replace "among MINI" with --among M2M--.

Signed and Sealed this
Twenty-second Day of October, 2019

Andrei Iancu
*Director of the United States Patent and Trademark Office*